United States Patent [19]

Marty et al.

[11] Patent Number: 4,459,205

[45] Date of Patent: Jul. 10, 1984

[54] CATALYST FOR THE OXIDATION OF MERCAPTANS TO DISULFIDES, PROCESS FOR THE PREPARATION THEREOF, AND ITS USE IN THE SWEETENING OF PETROLEUM DISTILLATES

[75] Inventors: Claude Marty; Philippe Engelhard, both of Le Havre, France

[73] Assignee: Compagnie Francaise de Raffinage, Paris, France

[21] Appl. No.: 544,016

[22] Filed: Oct. 21, 1983

Related U.S. Application Data

[62] Division of Ser. No. 483,631, Apr. 7, 1983.

[30] Foreign Application Priority Data

Apr. 9, 1982 [FR] France .............................. 82 06259

[51] Int. Cl.³ ........................................... C10G 27/04
[52] U.S. Cl. .................................. 208/191; 208/265; 208/107
[58] Field of Search ..................... 208/191, 207, 203

[56] References Cited

U.S. PATENT DOCUMENTS

| | | | |
|---|---|---|---|
| 4,090,954 | 5/1978 | Ward | 208/206 |
| 4,111,856 | 9/1978 | Haag et al. | 502/159 |
| 4,206,043 | 6/1980 | Carlson | 208/207 |
| 4,298,502 | 11/1981 | Carlson | 208/207 |
| 4,317,936 | 3/1982 | Kim et al. | 502/152 |

Primary Examiner—Delbert E. Gantz
Assistant Examiner—Cynthia A. Prezlock
Attorney, Agent, or Firm—Curtis, Morris & Safford

[57] ABSTRACT

A catalyst suited for use in the sweetening of petroleum distillates (by oxidizing mercaptans to disulfides) which is formed of a metal complex of a polyaminoalkyl-polycarboxylic acid deposited directly on a basic anion exchange resin. The method of making the source by exchanging a metal cation on an acidic resin; forming a complex by the action of a polyaminoalkylpolycarboxylic acid upon said resin; and exchanging the complex so formed on a basic anion exchange resin.

18 Claims, 2 Drawing Figures

CATALYST FOR THE OXIDATION OF MERCAPTANS TO DISULFIDES, PROCESS FOR THE PREPARATION THEREOF, AND ITS USE IN THE SWEETENING OF PETROLEUM DISTILLATES

This is a divisional application of our copending U.S. application Ser. No. 483,631, filed Apr. 7, 1983.

The present invention relates to a novel catalyst and its use in the sweetening of petroleum fractions by conversion of the mercaptans to disulfides.

As is known, wide use is made industrially of the properly exhibited by the chelates of certain metals (copper, cobalt, vanadium and nickel) of catalyzing the conversion of mercaptans to disulfides in the presence of oxygen. This property is being utilized to sweeten natural gasoline, gasolines obtained by distillation or cracking, naphtha, kerosene, aviation gasoline and solvents of any composition by the use of cobalt phthalocyanine, for example, in an aqueous alkaline medium.

Sweetening may also be effected by the use of an oxidation catalyst deposited on a carrier that is insoluble in soda and hydrocarbons. In a process of this type, described in French Pat. No. 1,301,844, the hydrocarbon feedstock is contacted with a fixed bed of cobalt phthalocyanine on activated carbon in the presence of air and an alkaline reagent.

However, this technique is afflicted with numerous drawbacks due, in particular, to the difficulties which impregnation of the carrier with the chelate entails and to the tendency of the chelate to desorb, which necessitates costly carrier reimpregnation operations.

It is known that most catalysts which have been deposited on a fixed bed of activated carbon, or of any other carrier, such as alumina or silica, are not always sufficiently well bonded to the carrier and under certain conditions may therefore be swept out of the reactor with the treated charge.

Those skilled in the art who have concerned themselves with this problem of the fixed bed have therefore sought to bond catalysts more firmly to their carriers and to that end have proposed the use of various resins as carriers.

Thus, U.S. Pat. No. 3,396,123 describes the preparation of a new type of carrier by heating a mixture of thermoplastic resin and activated carbon.

U.S. Pat. No. 4,145,486 describes the use of various type of metal complexes deposited on ion-exchange resins in other reaction areas and, in particular, in homogeneous catalysis.

French patent application No. 2,202,726, filed by the present assignee, describes the use as sweetening catalysts of metals in the state of ions or in the state of complexes which are deposited by impregnation, and only by impregnation, on an ion-exchange resin of the type of poly-4-vinylpyridine crosslinked with divinylbenzene. The metal compound used is cobaltous naphtenate, for example.

In pursuing their research, applicants have found that metal complex ions can be deposited directly on ion-exchange resins by exchange rather than by impregnation.

The invention thus has as a preferred embodiment a catalyst for the oxidation of mercaptans to disulfides which is characterized in that it is formed of a metal complex of a polyaminoalkylpolycarboxylic acid which is deposited directly on a basic anion exchange resin.

The catalysts in accordance with the invention are formed, in particular, of complexes of metals comprising especially cobalt, zinc, nickel, iron, copper, vanadium, titanium, chromium or molybdenum with a polyaminoalkylpolycarboxylic acid which are deposited on a basic anion exchange resin. These catalysts make possible the sweetening of mercaptans contained in petroleum fractions under particularly attractive conditions.

The present invention further relates to the preparation of this novel catalyst by exchange of a metal complex ion with the anions of a carrier resin. This operation may be carried out, in particular, in three steps by the following general scheme:

In a first step, the exchange of the cation which it is desired to deposit is carried out on an acidic resin in accordance with the following reaction formula, for example:

$$M^{2+} + 2R\ SO_3-H \rightarrow (R\ SO_3)_2M + 2H^+,$$

wherein M represents a metal such as cobalt, zinc, nickel, iron, copper, vanadium, titanium, chromium or molybdenum and R is a group of the styrenedivinylbenzene type.

The second step consists in the formation of the metal complex in accordance with a reaction such as this:

$$(R\ SO_3)_2M + Y\ H_2{}^{2-} \rightarrow 2R\ SO_3H + MY^{2-},$$

wherein Y represents an ethylenediaminetetraacetic group, for example.

The complexing agent used is one of the compounds having at least one aminoacetic group, such as the polyaminoalkylpolycarboxylic acids, which include ethylenediaminetetraacetic acid, nitrolotriacetic acid, cyclodiaminetriacetic acid, hydroxyethylenediaminetriacetic acid, diethylenetriamine pentaacetic acid and the respective salts, the preferred complexing agent in accordance with the present invention being the disodium salt of ethylenediaminetetraacetic acid.

Finally, in a third step, the $MY^{2-}$ complex is exchanged with the anions of a basic resin.

A large number of basic anion exchange resins is suited for use in accordance with the invention, particularly those which contain at least one primary, secondary and/or tertiary amine functional group, the latter two being among the most active. Some of these resins are available commercially, particularly those trademarked AMBERLYST, AMBERLITE and DUOLITE.

The exchange reaction with a resin containing at least one tertiary amine functional group may proceed in accordance with the formula:

$$2[R-N^+(CH_3)_3]X^- + MY^{2-} \rightarrow [R-N^+(CH_3)_3]_2 MY^{2-} + 2X^-,$$

wherein M, R and Y have the meanings given above and $X^-$ is a halide ion, for example, a chloride ion.

The sweetening of the mercaptans contained in the petroleum fractions to disulfides by the use of the catalyst of the invention may be carried out by one of two processes described below with reference to the accompanying drawings, wherein:

FIG. 1 illustrates the sweetening of a gasoline with continuous injection of an aqueous soda or potash solution into the reactor, and

| | |
|---|---|
| Relative pressure | 0.5 bar |
| Temperature | 30° C. |
| Volume of air per gram of mercaptan | 6 standard liters/gram |
| Hourly space velocity of charge (volume of charge passing over a unit volume of catalyst per hour) | 1 |

After treatment in the reactor, the effluent was separated in separator 7 from the air which it contained. Analysis of the effluent showed that the sulfur from the mercaptans had been converted to disulfides over a period of 400 hours, the degree of sweetening being over 95%.

EXAMPLE 4

This example relates to the treatment of an industrial feedstock.

The test was carried out under the same conditions as in the preceding example with an industrial feedstock consisting of a 50/50 mixture (by volume) of light gasoline and heavy gasoline obtained by catalytic cracking.

The feedstock, whose specific gravity at 15° C. was 0.779, contained 34.1% aromatic compounds, 27.2% olefins and 38.7% saturated hydrocarbons. It further contained about 800 ppm phenols, 200 to 400 ppm mercaptan sulfur, and 1,000 to 2,000 ppm total sulfur.

The operating conditions were as follows:

| | |
|---|---|
| Catalyst volume | 20 cm$^3$ |
| Relative pressure | 0.5 bar |
| Temperature | 30° C. |
| Volume of air per gram of mercaptan | 2 standard liters/gram |
| Hourly space velocity of charge | 1 to 4 |

Notwithstanding the variations in the hourly space velocity, the gasoline was sweetened over a period of 500 hours, during which time the phenol concentration of the charge dropped to 28 ppm.

EXAMPLE 5

This example relates to the sweetening of an industrial feedstock over a cobalt-based catalyst.

A feedstock analogous to that of Example 4 was treated under the same conditions as in that example with a cobalt-based catalyst prepared in accordance with Example 2 and mixed with 10 wt. % solid potash.

The sweetened gasoline had the following characteristics, as contrasted with the charge:

| | Charge | Effluent |
|---|---|---|
| Total sulfur, ppm | 2000 | 1970 |
| Mercaptans, ppm | 400 | — |
| Phenols, ppm | 900 | 600 |
| ASTM color | ≦0.5 | ≦0.5 |
| Cobalt, ppm mg/100 ml | 0 | 0 |
| unwashed | 45 | 10 |
| washed | 39 | 4 |

EXAMPLE 6

This example relates to the sweetening of a gasoline over an iron-based catalyst.

The gasoline was an industrial gasoline containing 400 ppm of mercaptan sulfur which was treated under conditions similar to those of Example 4.

The operating conditions were as follows:

| | |
|---|---|
| Temperature | 30 to 50° C. |
| Relative pressure | 0.5 bar |
| Volume of air per gram of mercaptan | 2.4 standard liters/gram |
| Hourly space velocity of charge | 1 |

It was found that the effluent contained no iron and that over a period of more than 50 hours the charge had been sweetened to mercaptan contents of less than 8 ppm.

EXAMPLE 7

This example relates to the sweetening of an industrial gasoline over a nickel-based catalyst.

The gasoline was the same as in the preceding example. It was treated by means of a nickel-based catalyst prepared in the same manner as the cobalt catalyst.

The operating conditions were as follows:

| | |
|---|---|
| Temperature | 30° C. |
| Relative pressure | 0.5 bar |
| Volume of air per gram of mercaptan | 2.7 standard liters/gram |
| Hourly space velocity of charge | 1 |

The effluent contained no nickel. Over a period of more than 70 hours, the charge had been sweetened to mercaptan contents of less than 2 ppm.

EXAMPLE 8

This example relates to the sweetening of a charge over a resin with the addition of soda in accordance with the flow sheet of FIG. 1.

A cobalt-based resin was prepared in accordance with Example 2 and mixed with solid potash in a weight ratio of 90% resin and 10% powdered potash. The catalyst was placed in the reactor 1 of FIG. 1.

A charge of the same type as in Example 4 with 1,074 ppm total sulfur was injected into that reactor through line 2.

Throughout the time of injection, a 3.4 wt. % solution of soda in a mixture of methanol and water (weight ratio, 75:25) was introduced continuously through line 5 at the rate of 200 ppm, based on the charge.

The conditions and results of this test are given in the table which follows.

| Time (hours) | Temperature (°C.) | Pressure (bars) | Hourly space velocity | Std. ltrs. air g sulfur mercaptan | NaOH sol'n charge (ppm) |
|---|---|---|---|---|---|
| 0–50 | 30 | 8 | 1 | 2.2 | 200 |
| 50–290 | 30 | 8 | 2 | 3.4 | 200 |
| 290–310 | 30 | 20 | 1.5 | 2.2 | 266 |

-continued

| Time (hours) | Temperature (°C.) | Pressure (bars) | Hourly space velocity | Std. ltrs. air g sulfur mercaptan | NaOH sol'n charge (ppm) |
|---|---|---|---|---|---|
| 310–450 | 50 | 20 | 1.5 | 2.2 | 266 |

During the first 250 hours of the test, the mercaptan concentration in the effluents was less than 2.5 ppm of mercaptan sulfur. This concentration increased slightly thereafter without, however, exceeding 5 ppm after 450 hours of operation.

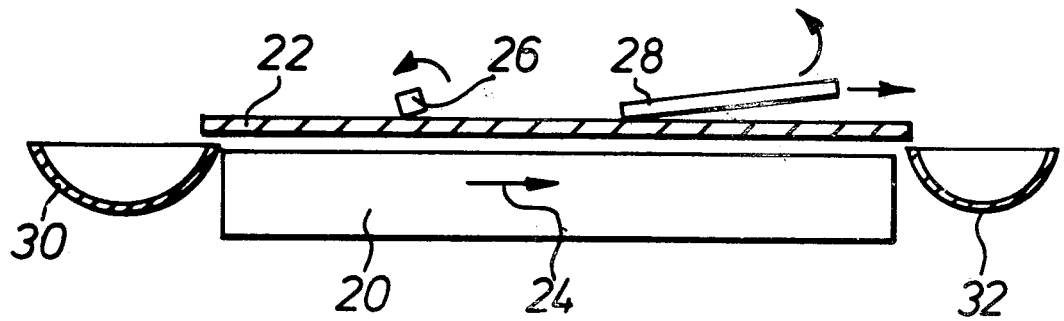

We claim:

1. In the method of sweetening of petroleum distillates, the improvement comprising use of a catalyst for the oxidation of mercaptans to disulfides, which catalyst comprises a metal complex of polyaminoalkylpolycarboxylic acid deposited directly on a basic anion exchange resin.

2. A method according to claim 1, wherein the polyaminoalkylpolycarboxylic acid is ethylenediaminetetraacetic acid or one of its salts.

3. A method according to claim 1, wherein the metal used to form the complex is a metal selected from the group consisting of cobalt, nickel, iron, zinc, copper, vanadium, titanium, chromium and molybdenum.

4. A method according to claim 1, wherein the metal used to form the complex is a metal selected from the group consisting of cobalt, copper, nickel and iron.

5. A method according to claim 1, wherein the basic anion exchange resin contains at least one amine functional group.

6. A method according to claim 1, wherein the basic anion exchange resin contains at least one quaternary ammonium functional group.

7. A method according to claim 2, wherein the metal used to form the complex is a metal selected from the group consisting of cobalt, copper, nickel and iron.

8. A method according to claim 2, wherein the basic anion exchange resin contains at least one amine functional group.

9. A method according to claim 7, wherein the basic anion exchange resin contains at least one amine functional group.

10. A method according to claim 2, wherein the basic anion exchange resin contains at least one quaternary ammonium functional group.

11. A method according to claim 7, wherein the basic anion exchange resin contains at least one quaternary ammonium functional group.

12. The method of sweetening petroleum distillates by oxidizing mercaptans contained therein to disulfides, comprising contacting said distillates with a fixed bed of a catalyst formed by a metal complex of a polyaminoalkylpolycarboxylic acid deposited directly on a basic anion exchange resin, said contacting being done in the presence of a strong base and oxygen at a temperature ranging from 0° to 125° C. and a pressure ranging from 1 to 50 bars.

13. The method of claim 12, wherein the polyaminoalkylpolycarboxylic acid is ethylenediaminetetraacetic acid or one of its salts, the metal used to form the complex is a metal selected from the group consisting of cobalt, copper, nickel and iron, and the basic anion exchange resin contains at least one amine functional group.

14. The method of claim 12, wherein the polyaminoalkylpolycarboxylic acid is ethylenediaminetetraacetic acid or one of its salts, the metal used to form the complex is a metal selected from the group consisting of cobalt, copper, nickel and iron, and the basic anion exchange resin contains at least one quaternary ammonium functional group.

15. The method according to claim 12, wherein the base is injected in liquid form into the distillates to be treated in an amount from about a stoichiometric ratio to the mercaptans to a ratio slightly in excess thereof.

16. The method of claim 15, wherein the polyaminoalkylpolycarboxylic acid is ethylenediaminetetraacetic acid or one of its salts, the metal used to form the complex is a metal selected from the group consisting of cobalt, copper, nickel and iron, and the basic anion exchange resin contains at least one amine functional group.

17. The method of sweetening petroleum distillates by oxidizing mercaptans contained therein to disulfides, comprising contacting said distillates with a fixed bed of a catalyst formed by a metal complex of a polyaminoalkylpolycarboxylic acid deposited directly on a basic anion exchange resin, said complex being mixed directly with solid potash in a proportion ranging from 5 to 25 weight percent of the total weight of the fixed bed including catalyst and potash, said contacting being done in the presence of oxygen at a temperature ranging from 0° to 125° C. and a pressure ranging from 1 to 50 bars.

18. The method of claim 17, wherein the polyaminoalkylpolycarboxylic acid is ethylenediaminetetraacetic acid or one of its salts, the metal used to form the complex is a metal selected from the group consisting of cobalt, copper, nickel and iron, and the basic anion exchange resin contains at least one amine functional group.

* * * * *

United States Patent [19]

Laithwaite

[11] Patent Number: 4,459,206
[45] Date of Patent: Jul. 10, 1984

[54] SEPARATION OF NON-FERROMAGNETIC METALS FROM FRAGMENTED MATERIAL

[75] Inventor: Eric R. Laithwaite, Surbiton, England

[73] Assignee: Cotswold Research Limited, England

[21] Appl. No.: 368,742

[22] Filed: Apr. 15, 1982

Related U.S. Application Data

[63] Continuation of Ser. No. 117,794, Feb. 1, 1980, abandoned.

[30] Foreign Application Priority Data

Feb. 1, 1979 [GB] United Kingdom ................. 7903621

[51] Int. Cl.$^3$ .............................................. B03C 1/24
[52] U.S. Cl. ........................................ 209/3; 209/38; 209/227; 241/79.1
[58] Field of Search ............... 209/629, 636, 212, 213, 209/214, 215, 216, 227, 38, 3; 100/91; 241/79.1; 318/135

[56] References Cited

U.S. PATENT DOCUMENTS

| | | | |
|---|---|---|---|
| 2,971,703 | 2/1961 | Rath | 209/629 X |
| 3,111,484 | 11/1963 | Cavanagh | 209/227 |
| 3,905,556 | 9/1975 | Drage | 241/79.1 X |
| 3,950,661 | 4/1976 | Langmuir | 209/227 X |
| 4,036,441 | 7/1977 | Basten et al. | 241/79.1 X |
| 4,062,767 | 12/1977 | Rudy | 209/212 |
| 4,071,442 | 1/1978 | Morey | 209/212 |
| 4,137,156 | 1/1979 | Morey et al. | 209/227 X |
| 4,229,288 | 10/1980 | Akama | 209/212 |
| 4,362,276 | 12/1982 | Morey | 241/79.1 X |

FOREIGN PATENT DOCUMENTS 659188  4/1979  U.S.S.R. ............................. 209/212

Primary Examiner—Robert B. Reeves
Assistant Examiner—Edward M. Wacyra
Attorney, Agent, or Firm—Jones & Askew

[57] ABSTRACT

A system for sorting non-ferromagnetic metals from a mixture of material containing such metals and rubber and plastics material including a conveyor belt system and an associated linear induction motor the frequency and power of operation of which is chosen to deflect selected metals from the conveyor belt. The linear induction motor is placed beneath the conveyor belt and oriented with respect to the conveyor to produce a field of magnetomotive force in which the lines of the magnetic field are at right angles to the direction of motion of the conveyor, and in which the direction of travel of the field is orthogonal to both the lines of force and the direction of motion of the conveyor. The mixture of material subjected to the force of the linear induction motor may initially be treated by presizing or flattening, to enhance the effectivity of the induction motor in separating non-ferromagnetic material.

14 Claims, 12 Drawing Figures